United States Patent [19]
Frantom et al.

[11] Patent Number: 5,437,188
[45] Date of Patent: Aug. 1, 1995

[54] TELL TALE DEVICE FOR A PRESSURE VESSEL

[75] Inventors: Richard Frantom, Richmond; Robert J. Bishop, Sterling Heights; Robert Kremer; Klaus F. Ocker, both of Fraser; Stephen P. McGarry, Rochester Hills; Will E. Rogers, Rochester, all of Mich.

[73] Assignee: AlliedSignal Inc., Morristown, N.J.

[21] Appl. No.: 189,228

[22] Filed: Jan. 31, 1994

[51] Int. Cl.⁶ .................... G01L 7/00; G01L 189/228
[52] U.S. Cl. .................................. 73/709; 73/715
[58] Field of Search .................. 73/709, 715, 35 R

[56] References Cited

U.S. PATENT DOCUMENTS

| | | |
|---|---|---|
| 1,344,722 | 6/1920 | Schulz . |
| 3,706,229 | 12/1972 | De Vost et al. ............. 73/709 |
| 4,715,231 | 12/1987 | Lee, II et al. ............... 73/709 |
| 4,881,400 | 11/1989 | Goodman et al. ........... 73/709 |
| 4,932,264 | 6/1990 | Hawkins et al. ............. 73/709 |

*Primary Examiner*—Richard E. Chilcot, Jr.
*Assistant Examiner*—R. L. Biegel
*Attorney, Agent, or Firm*—Markell Seitzman

[57] ABSTRACT

A post activation device to indicate that pressure the existed within a pressure vessel just prior to the opening of the pressure vessel and the resulting loss of pressurization, having a diaphragm, plug or piston (62, 130, 160, 330) capable of rupturing, moving or deforming in response to a pressure differential thereacross above one or more low limit values and for providing an indication of the pressure within the pressure vessel just prior to its being opened, and a support member (70), within the pressure vessel for supporting the diaphragm, plug or piston means.

13 Claims, 4 Drawing Sheets

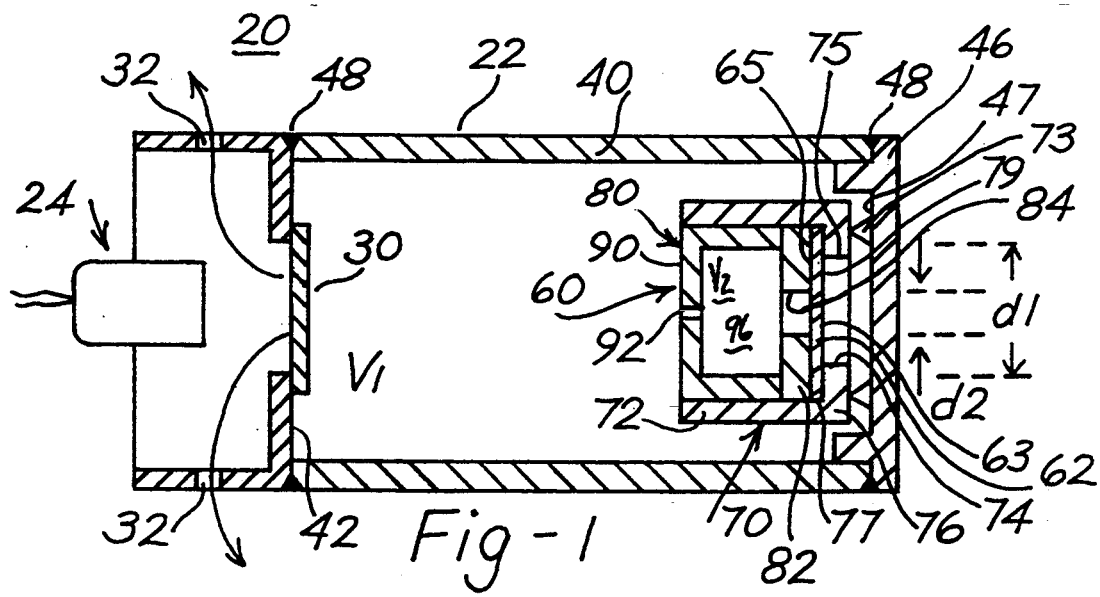
Fig-1
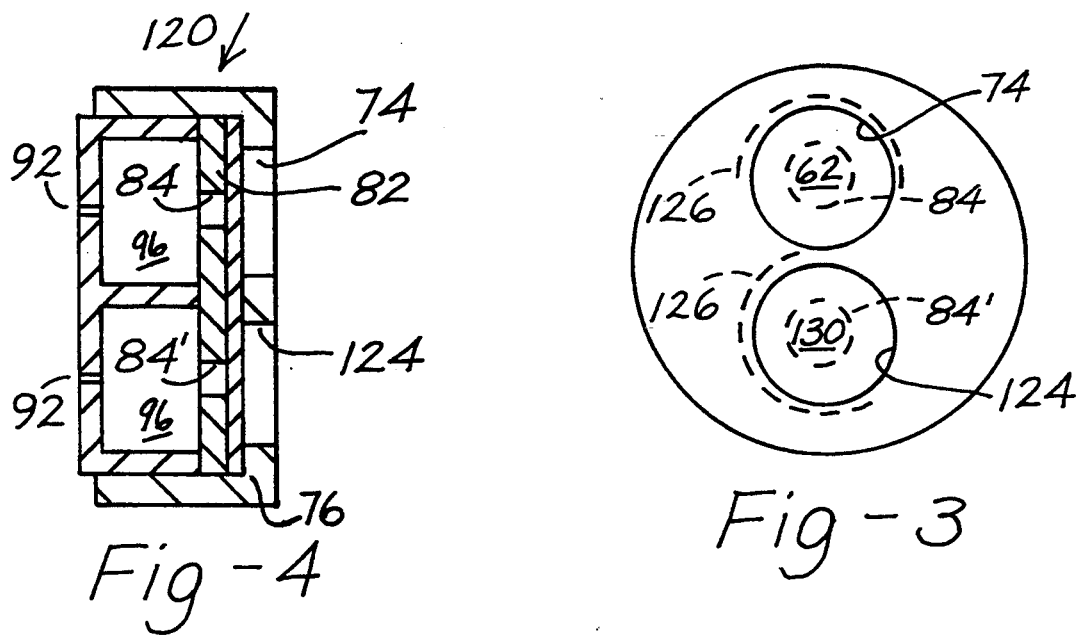
Fig-4
Fig-3
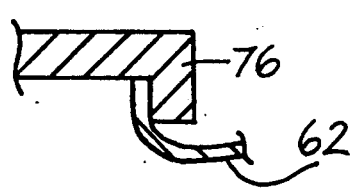
Fig-7
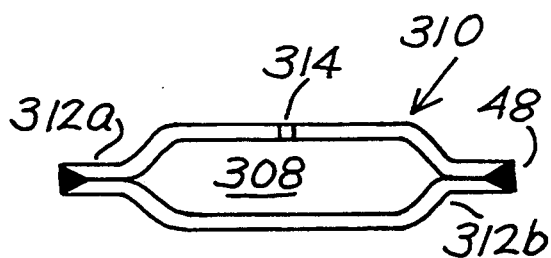
Fig-15

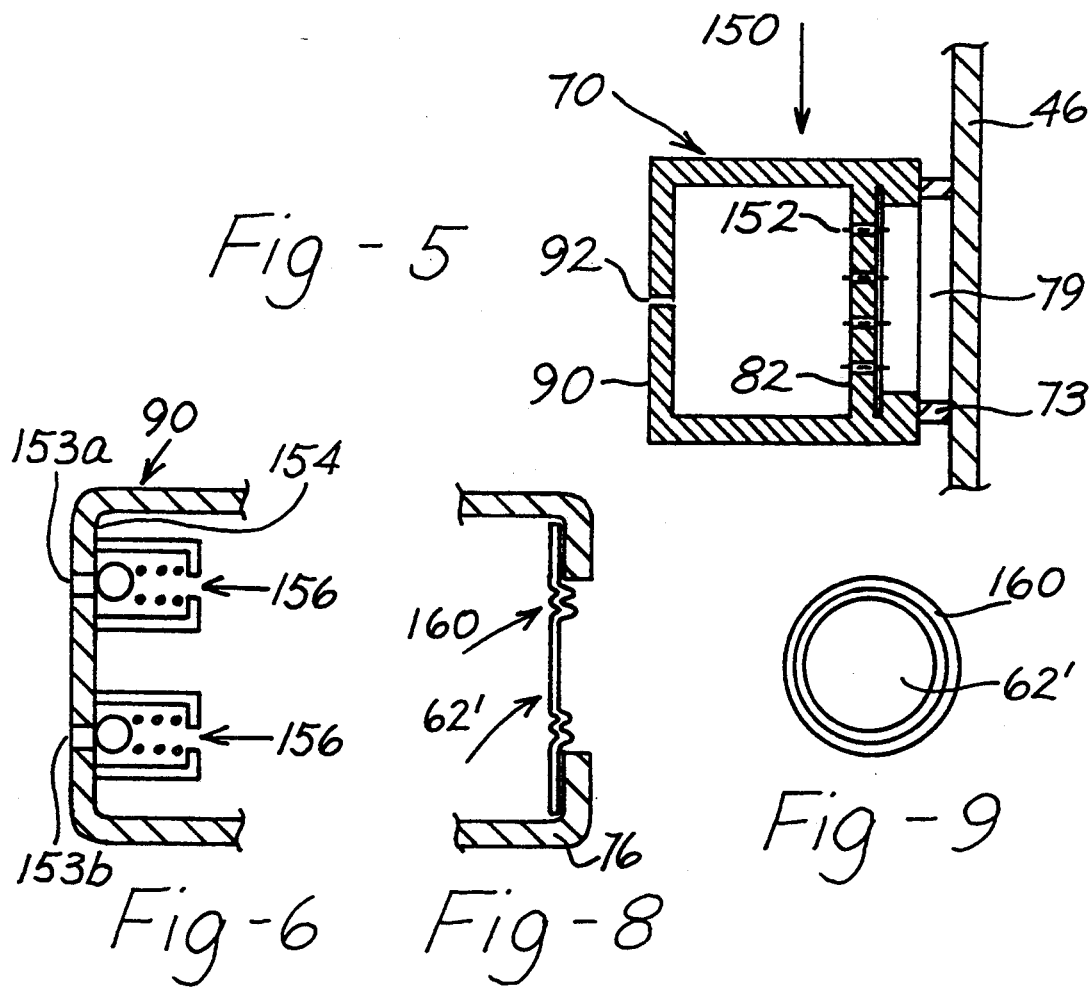
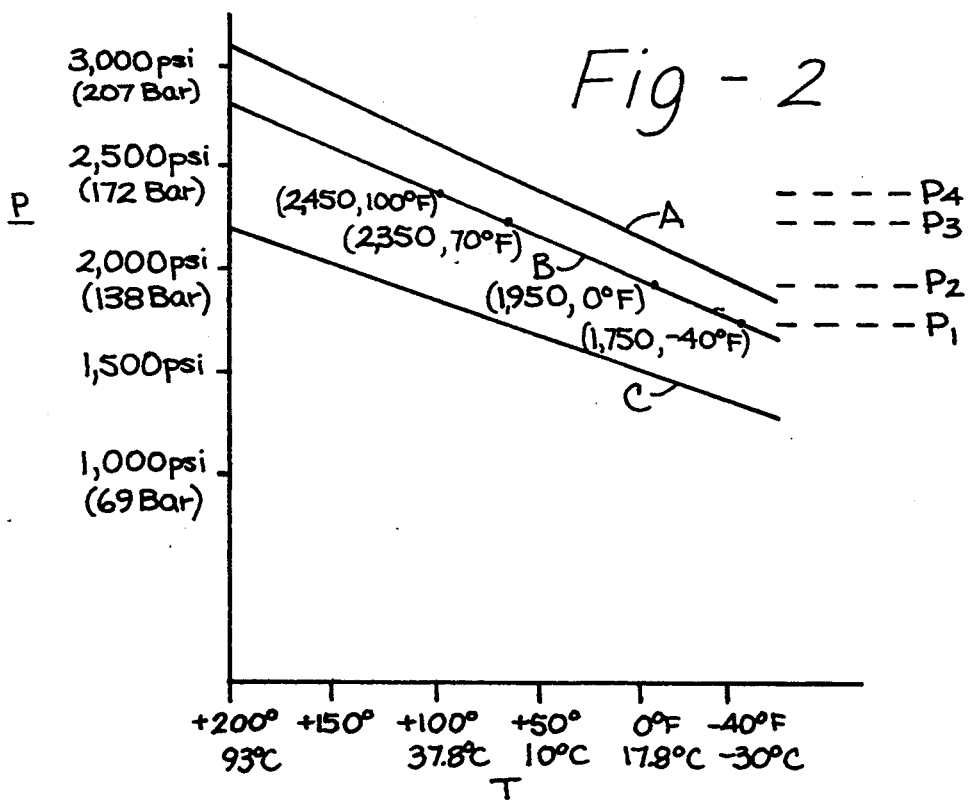

TELL TALE DEVICE FOR A PRESSURE VESSEL

BACKGROUND AND SUMMARY OF THE INVENTION

The present invention relates to a device that can be used to indicate the pressure that existed within a pressure vessel just prior to its being opened. More particularly, the present invention is useful in occupant safety restraint systems employing hybrid inflators.

Hybrid inflators typically include a pressure vessel having a quantity of stored gas under pressure. If such an inflator, after being installed in a vehicle, leaked during its useful product life, there may not be sufficient pressurized gas therein to adequately inflate an air bag. Some hybrid inflators include a low pressure switch to generate a warning signal to the driver, in the event that a determinable quantity of gas has leaked out of the inflator. The low pressure switch is connected with electronic circuitry to enable a warning indicator such as a light in the instrument panel. The pressure sensor signal indicates that the inflator may not be in an operative condition and that repair or replacement may be needed. History and experience have shown that the use of a low pressure switch is unnecessary. Pressure sensors include wires which extend through openings in the pressure vessel. These openings are appropriately sealed using a glass to metal seal of known variety. As can be appreciated these wires create a potential leak path if they are not correctly sealed. The low pressure switch, and its corresponding circuitry or electronic signal conditioning unit, are used also to provide an electronic record such as storing a coded message on a memory chip, to determine whether or not a pressure sensor signal was generated as an indication that the inflator was or was not properly functioning prior to an accident. If the pressure sensor is eliminated there is still a need to show that the hybrid inflator was properly pressurized prior to an accident and contained a sufficient amount of pressurized gas to inflate an air bag.

It is the object of the present invention to provide a device for use within the hybrid inflator that will provide a post depressurization, or "tell tale", indication that the inflator functioned properly. An additional object of the present invention, is to provide an hybrid inflator having a higher degree of reliability against leakage than one that includes a pressure switch.

Accordingly, the invention comprises: a) storing the fluid in a member at the pressure level that existed in the pressure vessel prior to depressurization, b) providing in the member a part sensitive to the pressure differential thereacross, the pressure differential comprising the pressure in the member and the pressure in the pressure vessel, c) causing the member to move in response to the pressure differential generated upon depressurization to provide a permanent indication of the pressure stored in the member. More specifically, the device comprises: first means capable of one of rupturing, moving or deforming in to response a pressure differential thereacross above a low limit value and for providing an indication of the pressure within the pressure vessel just prior to its being opened, and support means within the pressure vessel for supporting the first means. Various embodiments of the device are provided.

Many other objects and purposes of the invention will be clear from the following detailed description of the drawings.

BRIEF DESCRIPTION OF THE DRAWING:

FIG. 1 illustrates the major components of a first embodiment of the invention.

FIG. 2 shows a family of pressure-temperature curves.

FIG. 3 and 4 illustrate an alternate embodiment of the invention.

FIG. 5 shows a third embodiment of the invention.

FIG. 6 shows a further embodiment of the invention.

FIG. 7 shows a ruptured diaphragm.

FIGS. 8 and 9 shown a diaphragm capable of being deformed.

FIGS. 14, 15 and 16 show a additional embodiments of the invention.

Figures 10, 11:
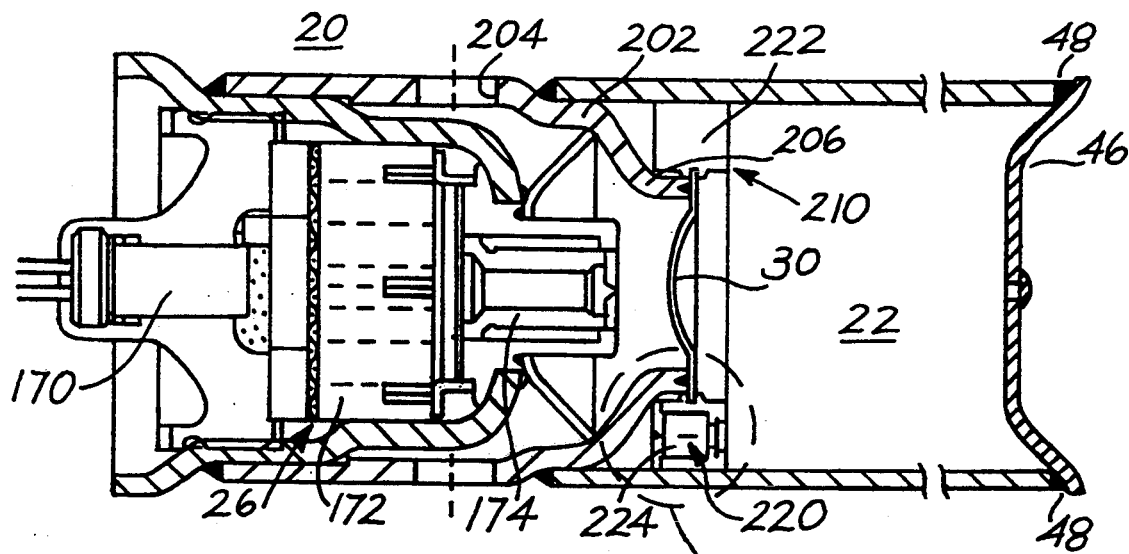
FIGS. 10–13 show another embodiment of the invention.

DETAILED DESCRIPTION OF THE DRAWINGS:

Reference is made to FIG. 1 which schematically illustrates a hybrid inflator 20 comprising a pressure vessel portion 22 and an activation portion 24 which is known in the art as well as the improvement provided by the present invention. One prior art hybrid inflator is shown in U.S. Pat. No. 5,076,607 which is incorporated herein by reference. The activation portion 24 comprises an generator portion 26 that may comprise a pyrotechnic squib or initiator of known construction which when activated by a control signal causes a closely positioned quantity of propellent to burn causing a rupturable disk 30, on a portion of the pressure vessel 22, to open. The opening of the disk 30 permits the gas stored in the pressure vessel 22 to rapidly flow out through openings 32. As it is known in the art, various means exist for rupturing the disc 30, such as by rupturing the disc by the products of the combustion created upon activation of the squib, or the propellant or by using products of combustion of the burning propellant to move a piston (not shown) to forcibly puncture the disc 30.

The pressure vessel portion 22 includes a cylindrical wall 40 and end pieces or caps 42 and 46. The end piece 42 supports the rupturable disk 30. The end pieces 42 and 46 are typically welded to the wall 40. A typical weld is shown by numeral 48. The pressure vessel 22 includes means for introducing the quantity inflation gas, under pressure such as a filling tube or ball or fill port and closure. As such means are widely known, they are not shown in the drawings. Situated at the right hand side of FIG. 1 and mounted to end cap 46 is a post depressurization indicator or "tell tale" device generally shown as 60. The device 60 comprising a diaphragm 62 that will rupture, move or deform when exposed to a pressure differential above of a predetermined low limit value. The device further includes a means for supporting the diaphragm. One such means for supporting the diaphragm is generally shown as a support member 70 and includes a first cylindrically shaped member 72 having a opening or port 74 of diameter, d1, in one end 76. In this embodiment of the invention a thin wafer 77 of non-porous material such as aluminum or glass is received on the inner surface 75 of the end 76. The diaphragm 62 is that portion of the wafer proximate at the opening 74. As can be seen side 63 of the wafer or diaphragm 62 is positioned upon and supported by the end 76. The wafer or diaphragm, on its other side 65 is supported by another portion of the support structure 70. This other portion of the support structure is generally shown as 80, and includes a backing plate 82. The backing plate, in this embodiment, includes a second opening 84 having a diameter of d2. The backing plate 82 clamps the edges of the diaphragm against the end cap 46 while loosely supporting the inner portions of the diaphragm, opposite opening 74, to enable pressurized gas inside of the support structure 70 to the opposite side or surface 65 of the diaphragm 62. Positioned adjacent the backing plate 62 is another cylindrical member 90, received within member 72. Member 90 includes a valve means such as a small orifice 92. Member 90 and member 72 are mated in a manner to prohibit or avoid any leak or flow paths therebetween. Member 90 may be threadably received within member 72 or alternatively welded or glued thereto. The opening 74 is spaced from the inner side 47 of the end cap 46 by stand offs 73, either on the end cap 46 or on the end 76 so as to create a passage 79 therebetween to permit a generally unrestricted flow of pressurized inflation gas, within the pressure vessel, to the opening 74 and hence to the active part of the wafer, i.e. to the diaphragm 62. The spacer volume V2 inside the device 60 defines a pressure storage cavity 96. The volume V2 is preferably smaller that the volume V1 of the pressure vessel.

In normal operation the pressure vessel 22 of the inflator 20 is filled with pressurized inflation gas typically 98% Argon and 2% Helium to a pressure of about 2500 psi (172 Bar). While not a part of the present invention the Helium is sensed by a leak detector to check the initial sufficiency of the welds. The pressurized inflation gas, in the pressure vessel 22, envelopes the device 60 and presses upon the exposed side 63 of the diaphragm 62. When the pressure vessel 22 is initially filled there is no inflation gas within the cavity 96 as fluid (gas) flow is inhibited by the small orifice 92. During this time a pressure force F acts on the exposed side 63 of the diaphragm equal to:

$$F = P \times d1,$$

where P is the internal pressure within the pressure vessel and d1 is the diameter of the opening 74.

Also at this time the pressure force acting of the opposite side 65 of the diaphragm is near zero and increases as gas fills the cavity 96. As mentioned the backing plate 82 supports the diaphragm while the opening 84 therein, provides a means of communicating the pressurized fluid in the cavity 96 to the entire rear active area of the diaphragm 62. The size of the opening in the backing plate is chosen to provide sufficient support to the diaphragm especially during the initial filling or pressurization to prevent the diaphragm from being ruptured or deformed because of the large, inwardly directed pressure differential. Over time, pressurized inflation gas enters into the cavity 96, through orifice 92, and acts upon the side 65 of the diaphragm. The pressure in the cavity equalizes at the internal pressure level of the pressure vessel.

When the inflator is activated, that is, depressurized and releases the pressurized gas, such as during a crash, the disk 30 is opened and an air bag, mounted nearby, is rapidly inflated, typically within about 40-60 milliseconds. When the pressurized inflation gas leaves the pressure vessel the internal pressure P rapidly approaches zero. Fluid flow into and out of the device 60 is inhibited by the valve means such as the orifice 92. As such, even though the pressure in the pressure vessel has rapidly reduced, the pressure Pc, within the cavity 96 of the device 60 cannot change rapidly. The pressure within the device just subsequent to the opening of the disk 30 remains substantially at the value of the pressure, inside the vessel pressure, just prior to when the disk 30 was opened. After release of the pressurized inflation gas a significant outwardly pushing pressure differential acts upon side 65 of the diaphragm to either break, move or substantially deform it.

Reference is briefly made to FIG. 2 which shows a family of curves. Each curve shows the approximate relationship between the pressure within a pressure vessel and temperature for an inflator having a given mass or weight of inflation gas. As an example, curve A shows the pressure-temperature relationship for an inflator that has not lost any inflation gas. Curve B shows the pressure-temperature relationship for an inflator that has lost a determinable amount of gas by weight or mass. Curve C shows an inflator that has lost a greater amount of gas. An inflator that has lost some of its inflation capability because of a diminished amount of stored inflation gas will not cause an air bag to inflate as fully as an inflator that is completely full. However, it should be appreciated that even though a significant amount of gas is lost the inflated air bag will still be able to adequately protect an occupant since the required speed of inflation and fullness of the air bag will depend amongst other things on the severity of a crash, the energy absorbing ability of the vehicle, the degree to which the occupant is retrained by a seat belt, and the position of the occupant relative to the air bag. Superimposed upon these curves is a pressure level P1. This pressure level P1 is indicative of a low level limit value of inflator pressure at a given temperature. Consequently, if the inflator is designed to properly operate if the conditions are above this level, the device 60 most be able to provide some post depressurization or activation indication that pressure in the pressure vessel 22 was, in fact, above this level. Implicitly this pressure level P1 also defines the minimum pressure differential force Pc×d1 that would be exerted on the diaphragm 62 just after depressurization under these pressure conditions. It should be recalled that the pressure force acting on side 63 rapidly falls to essentially zero and the pressure force acting on side 65 is equal to Pc×d1.

The diaphragm 62 is designed to break or deform when the pressure difference thereacross is greater than the minimum pressure force. Consequently, if the diaphragm is ruptured or deformed it will provide a direct indication of whether or not the pressure vessel contained a sufficient amount of gas to properly inflate the air bag. If the diaphragm 62 is ruptured or deformed there was a sufficient amount of gas in the inflator and if it was not there was not a sufficient amount of gas.

As can be appreciated from the above, an inspection of the device 60, after inflation, can only indicate that the pressure in the pressure vessel 22, just prior inflation, was above the minimum or low pressure limit value, P1. If it is deemed desirable to determine the value of pressure that existed just prior to inflation with greater specificity the device 60 may be modified as described below.

FIGS. 3 and 4 show an alternate embodiment of the present invention. More specifically, there is shown an alternate post inflation indicating device 120 having two pressure responsive diaphragm regions or portions, two cavities 96 and two orifices 92. A first diaphragm portion identical to that shown in FIG. 1 and a second diaphragm portion 130 designed to rupture or deform when the pressure within the pressure vessel is approximately above a pressure such as P2, also shown in FIG. 2. In this embodiment of the invention, the backing plate 82 includes an additional opening 84' positioned behind the second diaphragm portion 130. As can be seen from FIG. 3, the second diaphragm portion has a diameter greater than that of the diameter of the first diaphragm portion 62 so that lesser pressure will act on it with equivalent force. As also can be seen, the end 76 of the support 70 includes the first opening 74 to expose the first diaphragm 62 to internal pressure as well as an additional opening 124 to expose the larger diameter diaphragm 130 to the internal pressure within the pressure vessel. A single sheet or wafer of diaphragm material can be used to define the single diaphragm 62, as above, or the two diaphragm portions 62 and 130 of this embodiment. As an example, a large diameter, thin sheet of aluminum having an optional adhesive on one side such as 63, proximate the edge of the material is laid upon the end 76 of the support 70. The areas of this sheet of diaphragm material exposed to the inner pressure vessel chamber via the openings 74 or 130 define the diaphragms referred to above. Alternatively, individual sheets of diaphragm material can be used to define the diaphragm such as 62 and 130. In this case, the individual pieces of diaphragm material would be laid upon the end 76 of the support 70 about the each respective openings 74 and 124. These individual pieces of diaphragm material are schematically shown by the phantom 126 shown in FIG. 3. With regard to the embodiment of the invention shown in FIGS. 3 and 4 it should now become apparent that the post indication or depressurization can include any number of diaphragms or diaphragms portions (see FIG. 13), such as 62 and 130. The exposed diameter of each diaphragm is chosen such that each diaphragm is designed to rupture when the internal pressure within the pressure vessel, just prior to the opening of the pressure vessel, is above a pre-determined magnitude.

As an example, if the internal pressure within the pressure vessel, just prior to the opening is at about 3000 psi, then both diaphragms 130 and 62 would be ruptured or deformed outwardly due to the post activation pressure differential acting across them. In this case, the condition or position of both diaphragms 130 and 62 would indicate that the pressure within the pressure vessel was above the pressure P2 as well as above the pressure P1. If for example, the pressure in the pressure vessel, just prior to opening, is about 2200 psi (below pressure P1) a diaphragm 62 would not rupture or deform, however, diaphragm 130, corresponding to pressure P2 would rupture or deform indicating that the internal pressure was below the low extreme of pressure P1, but above the upper limit of pressure P2.

If further exactness is needed in determining the level of pressure that existed within the pressure vessel, just prior to its opening, additional diaphragms corresponding to intermediate pressures, such as P3, P4 etc. (see FIG. 2) can be accommodated into the support structure.

Reference is made to FIG. 5 which illustrates the further embodiment of the present invention. Shown therein is a partial section of the end cap 46 of the hybrid inflator. Positioned proximate and spaced from the end cap 46 is another tell tale device 150 structurally similar to the device shown in FIG. 1 having the support member 70 diaphragm 62, backer plate 82, and member 90 having the orifice 92. In this embodiment, the opening 84 in the backer plate is replaced by a plurality of passages 152. It should be apparent that the device 150 can also employ a plurality of diaphragms or diaphragm portions as illustrated in FIG. 3.

Reference is made to FIG. 6 which illustrates an alternate embodiment showing another version of the second cylindrical member used in any of the devices 60, 120 or 150. In this embodiment, the orifice valve 92 is replaced by a relatively large opening or openings 153a and/or b. The total area defined by the openings 153a and/or b is sufficiently large so as not to impede the flow pressurized gas into the cavity 96 of the device. Situated on an inside surface 154 of the member 90 is a flap valve or check valve 156 covering the opening or openings 153. The flap valve or check valve is operative to permit pressurized fluid to flow into the pressure storage cavity 96, but prohibit or at least inhibit flow therefrom when the pressure exterior to the device reduces below the pressure internal thereto.

FIG. 7 shows a ruptured diaphragm 62 where the central portion of the diaphragm has been moved outwardly showing the effect of the force of the pressurized gas within the cavity 96. FIG. 8 shows an unstressed deformable diaphragm 62' having a plurality of coined, circular ribs 160 which permit the diaphragm 62' to move outwardly, see phantom lines, in response the pressure stored in the storage cavity 96. FIG. 9 is a plan view showing the ribs 160.

Figure 12:
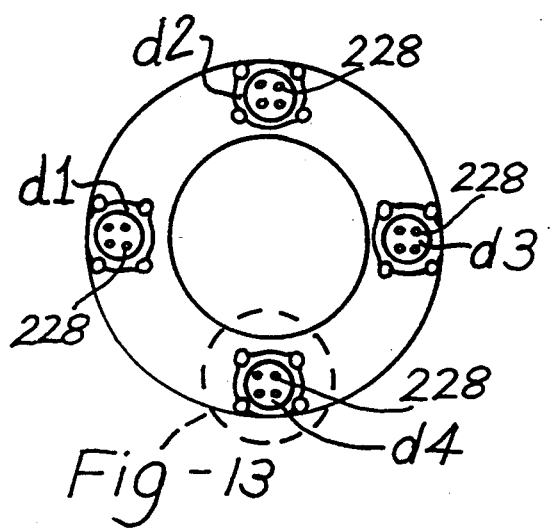
Figure 13:
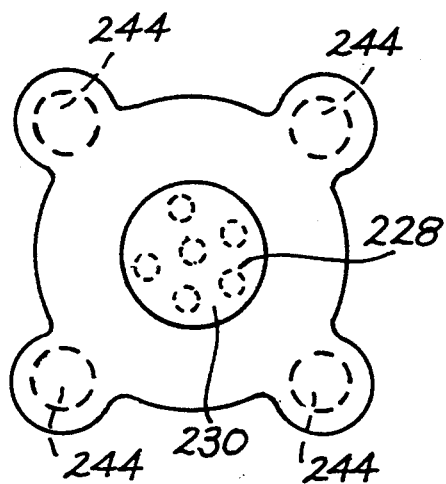
Figure 14:
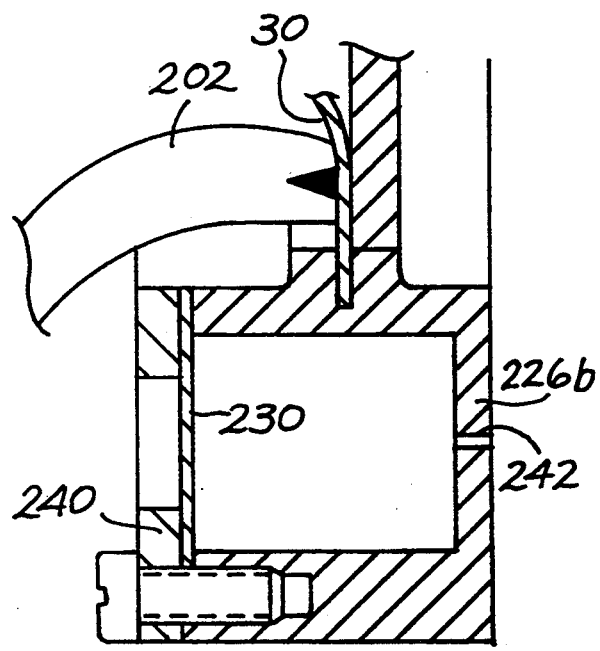

FIG. 10 shows another embodiment of the present invention. More specifically this is shown a hybrid inflator 20 having a pressure vessel portion 22, a generator portion 26 and an end cap 46 with a ball and fill port. The squib 170 and propellant 172 are also shown as is a movable piston 174 which punctures the frangible disk 30 attached to a manifold (end cap) 202 having exit ports 204. Positioned upon the narrowed portion 206 is the disk 30. The disk 30 is inserted or insert molded into a support member 210 which includes four tell tale devices 220. FIG. 11 is an enlargement of a portion of FIG. 10 and shows, in greater detail, the construction of one of the tell tale device 220, the others being generally of identical construction. The support member 210 comprises a plastic annular shaped portion 222 having formed therein four cavities 224 defined by wall portions 226a, 226b, and 226c. The edge of the disk 30 is insert molded within wall portion 226a of member 210. Each wall portion 226b of each cavity includes a plurality of passages 228 that are functionally identical to the passages 152 of the backing plate 82 (see FIG. 5). The wall portion 226b is functionally identical to the backing plate 82. Inserted or insert molded into wall portion 226b of each cavity 224 is a diaphragm 230. Each wall portion 226b includes an opening such as 232 which communicates the pressure in the hybrid inflator to each diaphragm 230. The size of each opening 232, i.e. the exposed diameter of the diaphragm d1, d2, d3, d4, may be different to permit a different force to be applied to a corresponding diaphragm in the manner as provided by the openings 74 and 124 of FIG. 3. Two or more openings 232 and diaphragm could be the same to provide sensing redundancy at a pressure level. Each cavity 24 is enclosed by a small plastic plate 240 typically ultrasonically welded to the support member 210 about the circular shoulder 212. The ultrasonic welds are diagrammatically shown as 241. Each plate 240 includes an orifice 242 therein to permit the cavity 224 to be filled in the manner as described above. Each plate 240 may additionally be secured to the support by a plurality of fasteners 244 which are received within threaded bores 246 or alternatively self tapping fasteners may be used. The subassembly including the support member 210, disk 30, diaphragms 230, plates 224 and fasteners 244 are positioned about the narrow end 206 of the manifold. With the support member 220 in place the disk 30 is laser welded to the manifold 202. FIG. 12 is a plan view of a portion of the support member 220 showing the placement of each of the four diaphragms 230, cavities 224, passages 228, etc. FIG. 13 is an enlarged view looking into one of the diaphragms. The operation of this embodiment is identical to that described above with the exception that four pressure band or regions are provided by the four tell tale devices 220. FIG. 14 shows another embodiment in which each wall portion 226b has the orifice 242 and each plate supports a diaphragm 230.

FIG. 15 shows another embodiment of the invention in which the pressure storage cavity 308 is formed by using a short length of thin wall tubing 310 closed at its ends 312a and b and welded shut. The tubing 310 includes a small hole or orifice 314 therein. The tubing may be mounted directly to the pressure vessel or insert molded to a support member such as 212 in place of the diaphragms 230, cavities 224 passages 228, etc., of FIG. 10. The pressure with the tubing 310 will eventually stabilize at the internal pressure of the pressure vessel. This embodiment of the invention uses a characteristic of tubes in that they tend to bulge outwardly when a sufficient pressure differential is applied across the wall of the thin tubing, but tends to hold its shape when the same pressure differential acts to compress it. When the disk 30 is opened, an radially outward pressure differential is generated, that is, after the pressure vessel is depressurized and the tubing will bulge outwardly providing an indication that the pressure within the pressure vessel, just prior to its being opened was open a predetermined low limit value, or values, is established by the yield strength of the tube, or tubes 310.

A multi-level sensing device can be made by using a plurality of tubing sections of differing lengths, diameters or thickness to provide the designed pressure differential sensitivity.

Figure 16:
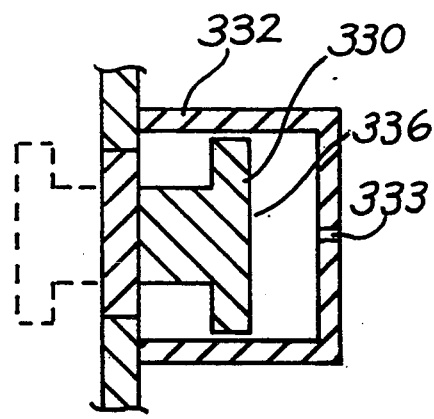
Figure 11:
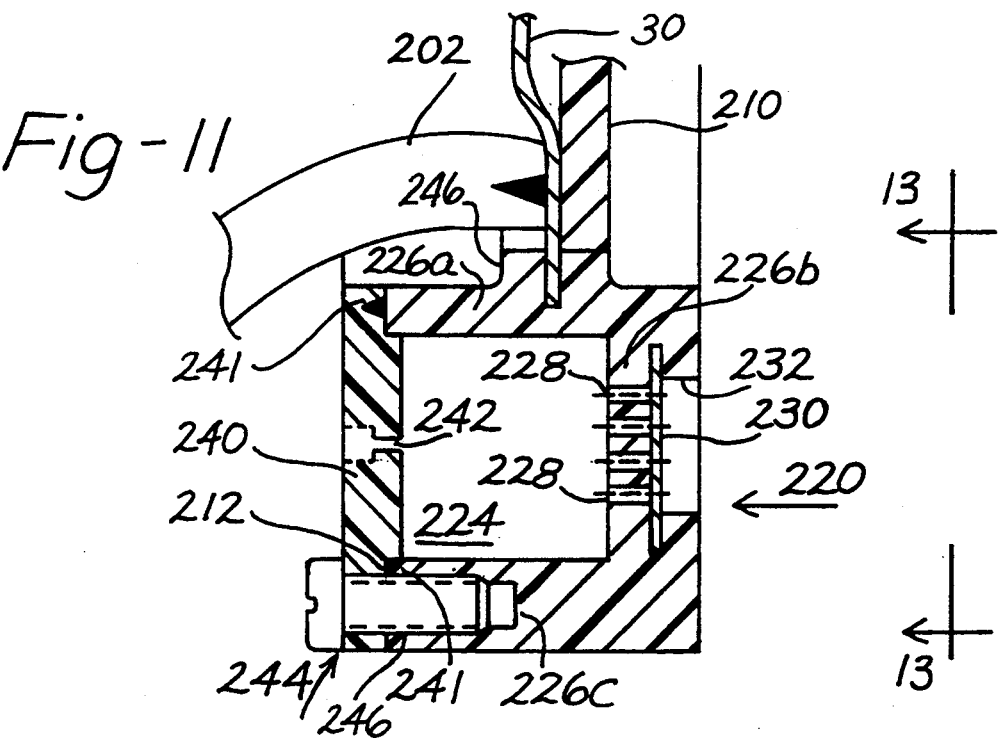

In FIG. 16 the diaphragms have been replaced by a plug or piston 330 that is press fit of friction fit into a support member 332 having an orifice 333. Upon depressurizing the pressure vessel, the pressure force in the support member 332, acting on the receiving surface 336 of the plug or piston 330 causes the piston to be permanently dislodged providing another way of indicating the pre-depessurization pressure level of the pressure vessel.

Many changes and modifications in the above described embodiment of the invention can, of course, be carried out without departing from the scope thereof. Accordingly, that scope is intended to be limited only by the scope of the appended claims.

We claim:

1. A post depressurization device to indicate the pressure that existed within a pressure vessel just prior to opening of the pressure vessel and the pressure vessel's resulting loss of pressure, comprising:

first means (62, 130, 160) for changing its physical state in response to a predetermined pressure differential thereacross and for providing an indication of the pressure within the pressure vessel just prior to its being opened, and support means (70), within the pressure vessel for supporting the first means including valve means for inhibiting the flow of a pressurized media into and out from the pressure storage chamber, the valve means operative to permit the pressure within the pressure storage means to equalize to approximately the pressure within the pressure vessel prior to opening to the pressure vessel.

2. The device as defined in claim 1 wherein the first means includes at least one diaphragm means capable of rupturing or deforming.

3. A post depressurization device to indicate the pressure that existed within a pressure vessel just prior to opening of the pressure vessel and the pressure vessel's resulting loss of pressure, comprising:

first means (62, 130, 160), located inside the pressure vessel, for changing its physical state in response to a predetermined pressure differential for providing an indication of the pressure within the pressure vessel just prior to its being opened, a first side of the first means exposed to the pressure in the pressure vessel;

pressure storage means (90,96) for storing, adjacent a second side of the first means generally opposite the first side, pressurized media at the pressure that existed within the pressure vessel just prior to the opening of the pressure vessel and its subsequent pressurization, whereby the opening of the pressure vessel causes a reduction the pressure aching on the first side such that the predetermined pressure differential relative the stored pressure in the pressure storage means is created.

4. The device as defined in claim 3 including support means for supporting the first means wherein the support means (70) includes a portion exposing a predetermined area of the first means (62, 130, 160, 330) to the internal pressure within the pressure vessel (22) while simultaneously exposing an opposite portion to the pressure within the pressure storage means (90, 96).

5. A post depressurization device to indicate the pressure that existed within a pressure vessel just prior to opening of the pressure vessel and the pressure vessel's subsequent resulting loss of pressure, comprising:

first means (62, 130, 160) for changing its physical state in response to a pressure differential above a low limit value and for providing an indication of the pressure within the pressure vessel just prior to its being opened, pressure storage means (90,96) for storing pressurized media at the pressure that existed within the pressure vessel just prior to the opening of the pressure vessel and its subsequent depressurization;

including valve means (92, 156) for inhibiting the flow of pressurized media into and out from the pressure storage chamber, the valve means operative to permit the pressure within the pressure storage means to equalize to approximately the pressure within the pressure vessel prior to opening of the pressure vessel.

6. The device as defined in claim 5 wherein the valve means is an orifice.

7. The device as defined in claim 5 including support means for supporting the first means, wherein the support means (70) includes a backing plate (82) loosely supporting the opposite portion of the diaphragm means including passage means for communicating the pressure internal to the storage cavity to the opposite portion.

8. The device as defined in claim 7 wherein the diaphragm means includes a plurality of diaphragms (62, 130) each having a different active area responsive to different low limit pressure value.

9. The device as defined in claim 5 wherein the pressure storage means includes at least one section of sealed tubing (310) having valve means (314) for introducing pressurized fluid therein.

10. The device as defined in claim 5 wherein the valve means is a flap valve.

11. The device as defined in claim wherein the valve means is a check valve.

12. A method of detecting the pressure level of fluid that existed in a pressure vessel just prior to it being depressurized, comprising the steps of:

(a) providing a pressure vessel having pressurized fluid stored therein, the pressure vessel including a member, b storing the fluid in a member at the pressure level that existed in the pressure vessel prior to depressurization, c providing in the member a part sensitive to the pressure differential thereacross, the pressure differential comprising the pressure in the member and the pressure in the pressure vessel, d. depressurizing the pressure vessel (e) causing the member to change its appearance in response to the pressure differential generated upon depressurization to provide a permanent indication of the pressure stored in the member.

13. The device as defined in claim 12 wherein the step of storing includes inhibiting the stored pressurized fluid from being quickly vented from the member.

* * * * *